(No Model.)

W. S. HOW.
ARTIFICIAL TEETH.

No. 276,245. Patented Apr. 24, 1883.

WITNESSES:
Wm A. Skinkle
Henry A. Lamb

INVENTOR:
Woodbury S. How,
By his Attorneys
Baldwin, Hopkins & Peyton

UNITED STATES PATENT OFFICE.

WOODBURY S. HOW, OF CINCINNATI, OHIO, ASSIGNOR TO THE S. S. WHITE DENTAL MANUFACTURING COMPANY, OF PHILADELPHIA, PA.

ARTIFICIAL TEETH.

SPECIFICATION forming part of Letters Patent No. 276,245, dated April 24, 1883.

Application filed February 16, 1883. (No model.)

*To all whom it may concern:*

Be it known that I, WOODBURY S. HOW, of Cincinnati, in the county of Hamilton and State of Ohio, have invented certain new and useful Improvements in Artificial Gum Teeth and Sections of such Teeth, of which the following is a specification.

My invention relates to artificial gum teeth and sections of such teeth, especially adapted for attachment to dentures—such as rubber or celluloid—to be fitted to the mouth.

Difficulty has heretofore been experienced in fitting the gum teeth or gum sections together in order to secure neat joints, while in packing the rubber or celluloid in the flask prior to baking great care has to be exercised in preventing the rubber or celluloid from showing through the joints of the teeth or sections.

The object of my invention is to avoid the difficulties of fitting the teeth or sections, and to readily prevent any danger of noticeable joints between them; and my invention consists in providing a gum tooth or section of such teeth with a thin flange on the lateral edges to facilitate joining and to secure unnoticeable joints.

A further object of my invention is to prevent the breakage or fracture of the porcelain tooth sections by shrinkage or contraction of the base in cooling; and to this end my invention consists in providing gum teeth sections with thin flanges on their lateral edges, or with an equivalent construction, so as to form a recess between the sections, and in filling said recess with a plastic material which will set or harden and resist the effect of the shrinkage or contraction of the base in cooling, which effect, if not counteracted, is liable to fracture or crack the block or sections.

Figure 1:
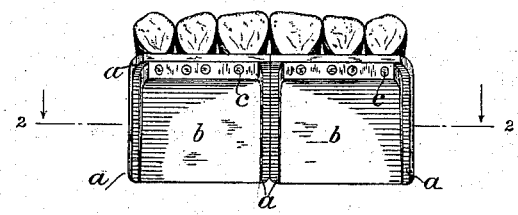
Figure 2:
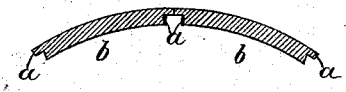
Figure 3:
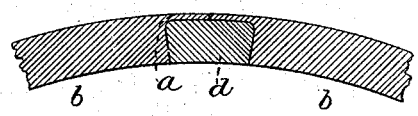

In the accompanying drawings, Figure 1 is a view in rear elevation of two gum teeth sections joined together at their flanged edges. Fig. 2 is a horizontal section through the gum portion of the teeth-sections on the line 2 2 of Fig. 1, and Fig. 3 shows two sections joined together with the recess at the rear filled with the plastic material.

The porcelain teeth and gums are constructed in well-known ways. In the drawings I have shown not a single gum tooth, but two sections of such teeth. It will be understood, however, that my invention may be applied to single gum teeth as well as to sections thereof.

The gum tooth section or single tooth is provided with thin flanges *a* at its lateral edges. The central portions, *b*, are of the usual size, and afford firm connection for the usual pins, *c*, which project from the back of the teeth, in order to enable them to be more securely fastened to the plate. In fitting the teeth or teeth-sections together the thin edges are joined, as shown in the drawings, and accurate fitting secured by grinding away more or less of the thin edge or flange *a*, as may be necessary to the particular case in hand. Neat and accurate fitting is thus readily secured.

Anterior to my invention the thickness of the teeth or sections was uniform, so that in fitting the teeth or sections together grinding or cutting of a comparatively thick body was necessary, and the result was that in most cases a wedge or other correspondingly-formed opening or recess at the back of the teeth or sections was formed, so that when the teeth or sections were flasked and the rubber or celluloid packed in place to form the plate a portion of the rubber or celluloid would be forced or wedged in between the adjoining edges of the teeth or sections, and would cause a dirty or noticeable joint to be made. In the present case, however, in fitting only a thin lateral flanged edge has to be ground or cut away, while when the joint has been satisfactorily made and the teeth flasked, a recess is formed at the back, not of an injurious wedge form, but a plain recess—for instance, such as shown in the drawings. In ordinary practice the joints of the teeth and sections, as above stated, are made more or less V-shaped—that is, the gum or anterior surface of the teeth touch, leaving a wedge-shaped space between them at the rear side of the joint—and when filled with some unyielding substance, as is sometimes done, it has the tendency to force the joint apart when packing or molding the plates; and if such a space is not entirely filled the shrinking or contraction of the plate in cooling will draw the two adjacent edges of the sections or blocks together and break or fracture said edges at the anterior or gum surface. In the present case the groove or recess formed by the joining of the two flanged edges of the teeth or sections is not of an injurious wedge form, and is preferably filled with a plastic material—such as oxychloride or phosphate cement commonly used by dentists—which soon sets and becomes sufficiently hard to prevent damage to the gum, the filling material acting as a key or support to the blocks or teeth. Fig. 3 shows the filling material $d$ in place in the joint between two of the teeth-sections.

I have not entered into an elaborate description of the usual manner of attaching gum teeth or gum sections to dental plates, as such practice is well known to all competent dentists; nor do I deem it necessary to further enlarge upon the advantages of the improvements made by me, as they also will be obvious to such persons.

I claim herein as my invention—

1. A gum tooth or section formed with a thin flange on the lateral edge of the gum portion of the tooth or section to facilitate ready and accurate fitting, substantially as described.

2. The improvement in the art of attaching gum teeth or teeth-sections to dental plates hereinbefore set forth, consisting in joining the teeth or sections together so as to form a recess at the back thereof, and in filling said recess with plastic material which sets or hardens so as to constitute a protection for the joint and prevent fracture by the contraction of the plate on cooling.

In testimony whereof I have hereunto subscribed my name this 10th day of February, A. D. 1883.

WOODBURY S. HOW.

Witnesses:
 ROBT. E. GORDON,
 S. EDWD. CAMPBELL.